(12) United States Patent
Ratakonda et al.

(10) Patent No.: US 8,903,916 B2
(45) Date of Patent: Dec. 2, 2014

(54) METHOD, SYSTEM, AND COMPUTER-READABLE MEDIUM TO RENDER REPEATABLE DATA OBJECTS STREAMED OVER A NETWORK

(75) Inventors: Krishna C. Ratakonda, Yorktown Heights, NY (US); Durga Sai Phaneendhar Vemuru, Mt. Vernon, NY (US); Peter H. Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 2641 days.

(21) Appl. No.: 11/480,351

(22) Filed: Jul. 5, 2006

(65) Prior Publication Data

US 2008/0010382 A1    Jan. 10, 2008

(51) Int. Cl.
*G06F 15/16* (2006.01)
*H04L 29/06* (2006.01)
*G06F 15/173* (2006.01)
*H04L 29/08* (2006.01)

(52) U.S. Cl.
CPC .......... *H04L 67/2847* (2013.01); *H04L 65/607* (2013.01); *H04L 67/289* (2013.01); *H04L 67/28* (2013.01); *H04L 65/4092* (2013.01)
USPC ............ 709/205; 709/203; 709/204; 709/223

(58) Field of Classification Search
USPC ................................................. 709/204–209
See application file for complete search history.

(56) References Cited

U.S. PATENT DOCUMENTS 5,710,591 A * 1/1998 Bruno et al. ................ 348/14.09
6,654,785 B1 * 11/2003 Craig ............................ 709/203

OTHER PUBLICATIONS

Waluyo et al., "Utilising Push and Pull Mechanisms in Wireless E-Health Environment", Proceedings of the 2004 IEEE Conference on e-Technolocgy, 2004.*
Meer et al., "RTP Payload Format for Transport of MPEG-4 Elementary Streams", RFC 3640, Nov. 2003.*
Nagaraj, "Web Caching and Its Applications" Klower Academic Publishers, 2004.*
Gao et al., "Catching and Selective Catching: Efficient Latency Reduction Techniques for Delivering Continuous Multimedia Streams", ACM Multimedia, vol. 10/99, 1999.*
H. Schulzrinne, A. Rao, R. Lamphier, "Real Time Streaming Protocol (RTSP)," RFC 2326, Apr. 1998.

(Continued)

*Primary Examiner* — Evans Desrosiers
(74) *Attorney, Agent, or Firm* — Anne V. Dougherty; Ryan, Mason & Lewis, LLP

(57) ABSTRACT

A system, method, and computer-readable medium that provides a streamed presentation to multiple clients over a network utilizing a presentation server that produces and streams audio, video, and uniquely identified auxiliary data objects (e.g., slides, 3D image models, sound bytes, web page, etc.) in separate sessions or channels over a network; a transmit queue associated with the presentation server to store uniquely identified repeatable auxiliary data objects; and a client that renders all data objects and stores the auxiliary data objects in a local memory cache so that they may be recalled according to their unique ID tags. The presentation server sends unique ID tags rather than the auxiliary data object content when repeated during the presentation. The client is responsive to unique ID tags to obtain an auxiliary data object from a local memory cache to render auxiliary content that is repeatedly presented during the presentation. A secondary network session may be made available to clients that join after the start of the presentation in order to obtain current auxiliary content.

18 Claims, 5 Drawing Sheets

(56) References Cited

OTHER PUBLICATIONS

M. Handley, V. Jacobson, "SDP: Session Description Protocol", RFC 2327, Apr. 1998.

H. Schulzrinne, S. Casner, R. Frederick, and V. Jacobson, "RTP: A transport protocol for real-time applications." RFC 1889, Jan. 1996.

J. van der Meer, D. Mackie, V. Swaminathan, D. Singer, and P. Gentric, "RTP Payload Format for Transport of MPEG-4 Elementary Streams", RFC 3640, Nov. 2003.

* cited by examiner

METHOD, SYSTEM, AND COMPUTER-READABLE MEDIUM TO RENDER REPEATABLE DATA OBJECTS STREAMED OVER A NETWORK

BACKGROUND

This invention relates data streaming, but more specifically to a method, system, and/or computer-readable medium to transmit repeatable or recurring data objects of multimedia presentation over a data communication network.

In a typical streamed presentation, audio and associated video information are conveyed from a source (e.g., a "server") to a destination (e.g., a "client") by sending audio and video data objects on separate physical or logical channels of a network. Streaming protocols generally define a first logical channel (e.g., a session) to convey audio data objects and a second logical channel to convey frame-by-frame video data objects. Multiple sessions may also be multiplexed into a single logical or physical channel for conveyance over a network. When data objects such as slides, sound bites, 3D objects, web pages, or the like are used to augment a presentation; prior systems used the video channel to carry such auxiliary data objects. Video-On-Demand (VOD) is a typical streaming application, which includes entertainment videos, corporate communications ("chairman's message"), education videos, lectures, etc. Streaming may also be used for real-time presentations such as live news feeds, video conferencing, peer-to-peer connections ("video phone" service), or other audio/video applications.

Network streaming protocols involve controlled, timed transmission of data objects to enable a client device to render (e.g., display or play back) successively transmitted data objects in real time in a predefined sequence where each object has a preset time-of-life and/or duration. For audio data objects, playback entails rendering sound by way of a speaker and, for visual data objects, playback entails displaying video information on a monitor. When received by a client device, received data objects are synchronously and simultaneously viewed and/or heard by an individual human user. Rendering audio and video, however, need not always be passive. If, for example, the objects conveyed relate to a three-dimensional model, the rendering system or method employed may enable a user to spin, zoom or otherwise manipulate the model. Unlike web pages or documents, however, streamed objects of a live presentation received out of sequence or outside their expected time window may not be rendered. As television, gaming machines and personal computers increasingly overlap in functionality, the type of streamed objects may likely go beyond video and audio to embrace other types of information. For example, an interactive ad displayed on television to which a user responds by clicking a button at a remote site is also considered a streamed object.

In many streaming applications such as remote educational services or corporate presentations, a presenter frequently augments the presentation with various types of auxiliary data objects. When using slides to augment the presentation, the presenter may revert or "jump back" to a previously transmitted slide thereby rendering slide data objects time-sensitive and/or repeatable. Repeated or recurring data objects normally are, but need not be, retransmitted each time they are referenced during the presentation. An attendee situated at a remote site, however, desires access to repeated data objects regardless of when he/she joins the presentation and, unless the repeated data object (e.g., a slide, 3D model, etc.) is retransmitted each time, it may not be immediately available to the attendee upon joining the presentation.

Using the same channel to convey both video and repeated auxiliary data objects is problematic. Ideally, different handling protocols should be employed in order to maintain efficiency in data transmission. At a point of origin, a presentation including slides, for example, required intermittent movement of a camera (or switching the image source) between a speaker and the slide. Moreover, slides, 3D models, web pages, or other presentation-augmenting data objects often require a higher resolution or higher bit rate transmissions than an image of frame-by-frame transmissions of motion video, which typically changes fifteen or thirty times per second under conventional standards. At low bit rate transmissions generally used for a video frame, conventional video data objects used for streaming were not very well suitable to convey data-rich content or graphic/text details of auxiliary or repeated data objects. Since these types of data objects change infrequently during most presentations, e.g., in the order of one to several minutes between views or renditions, video bandwidth wasted, particularly when a presentation-augmenting data object remained in the forefront of discussion for an extended period of time.

Infrequent updating of such "auxiliary" data objects also imposed an inconvenience or annoyance to attendees joining in the middle of a presentation. An attendee joining after inception may not immediately have the current auxiliary data object in a local memory cache and must wait for the next object to be sent in order to effectively join the presentation. This may take several minutes or more depending on the frequency of change. To exacerbate the problem, prior streaming presentation servers typically discarded all data objects as they were streamed to the clients or if the data object's playback start time had expired, and thus, a late-joining attendee may never obtain the active auxiliary data object at the time of joining. Hence, a crucial part of a presentation may never become available to a late-joining attendee. The present invention, however, seeks to solve these and other problems.

SUMMARY OF INVENTION

According to a first aspect of the present invention, a method of providing a streamed presentation to multiple clients over a network comprises generating audio, video, and auxiliary data objects; marking the auxiliary data objects with unique ID tags; streaming the audio, video, and tagged auxiliary data objects over the network; at the client devices, rendering the data objects and storing in a memory accessible by the client devices the auxiliary data objects and their associated unique ID tags; for repeated auxiliary data objects referenced during the presentation, sending associated unique ID tags instead of contents of auxiliary data objects; and at the clients, retrieving from local memory and rendering repeated auxiliary data objects according to their unique ID tags. Optionally, the audio, video, and auxiliary data objects may be streamed in separate network sessions. Also optionally, a client may request the presentation server to send a current auxiliary data object when first joining the network after commencement of the presentation. Auxiliary data objects may be maintained in a buffer queue of the presentation server after streaming so that their unique ID's rather than the full data object may be sent if they are subsequently referenced during the presentation. This save transmission bandwidth. Clients also maintain auxiliary data objects in a corresponding duplicate buffer queue from which to call up the same auxiliary data objects according to their unique ID tag transmitted from the presentation server. The buffer queues of the server and/or client may also contain time-of-life indicia to control rendering time of the auxiliary data objects.

In another aspect of the invention, a method of providing a presentation to multiple clients over a network comprises generating audio, video, and auxiliary data objects; marking the auxiliary data objects with respective ID tags; streaming the audio, video, and tagged auxiliary data objects in separate sessions over the network; after receipt by a client, rendering the data objects while storing in a local memory cache the auxiliary data objects and associated ID tags; maintaining at a presentation server a log of streamed auxiliary data objects and associated unique ID tags; in response to a message from a newly joined client, providing the newly joined client with contents of a current or active auxiliary data object under discussion; rendering the audio, video, and auxiliary data objects at a client; and retrieving from a local memory cache and rendering repeated auxiliary data objects according to their unique ID tags. The newly joined client may also obtain a requested auxiliary data object via a dedicated presentation server that handles specific requests or that transmits some or all auxiliary data objects in a round-robin fashion.

In another aspect of the invention, a method of broadcasting a streamed network presentation to multiple clients over a network comprises generating video, audio, and auxiliary data objects to respectively convey audio, video, and presentation-augmenting information; marking the auxiliary data objects with unique ID tags; streaming the audio, video, and tagged auxiliary data objects via separate sessions over a network; after receipt by a client, rendering the data objects while storing in a local memory the auxiliary data objects along with associated unique ID tags; maintaining at a presentation server a transmission log of streamed auxiliary data objects and their associated unique ID tags; for repeated auxiliary data objects referenced during the presentation, sending their associated unique IDs instead of the contents thereof; providing via a secondary broadcast the available auxiliary data objects along with their associated unique ID tags; and retrieving auxiliary data objects via the secondary broadcast in order to render repeated auxiliary data objects at a client.

In a further aspect of the invention, a method of unicasting a streamed network presentation to multiple clients over a network comprises generating corresponding video, audio, and auxiliary data objects for the audio, video, and presentation-augmenting information; marking the auxiliary data objects with unique ID tags; streaming the audio, video, and tagged auxiliary data objects over the network; after receipt by a client, rendering the data objects while storing in a memory the auxiliary data objects along with their associated unique ID tags; maintaining at a server a client transmission log that separately indicates which auxiliary data objects were received by respective clients accessing the network; rendering the data objects received by a client while locally saving auxiliary data objects along with their associated unique ID tags; for auxiliary data objects repeated during the presentation, checking the client transmission log to decide whether to send an associated unique ID tag instead of the full content of an auxiliary data object; and retrieving from memory and rendering auxiliary data objects at a client according to their ID tags.

An additional aspect of the invention comprises a computer-readable medium embodying program instructions executed by a digital computer to separately produce and stream audio, video, and uniquely identified auxiliary data objects in separate sessions. The medium enables a digital computer to stream the audio, video, and tagged auxiliary data objects over a network in separate sessions; to render the data objects at a client and store in a memory the auxiliary data objects with associated unique ID tags; for auxiliary data objects repeatedly referenced during the presentation, to send an associated unique ID tag instead of the contents of the corresponding auxiliary data object; and to retrieve from the client's memory to render repeated auxiliary data objects according to their ID tags. The program instructions may enable a client to request a current or active auxiliary data object upon joining a broadcast session or to obtain the current or active auxiliary data object via a session of a secondary broadcast.

In a further aspect of the invention, a system provides a streamed presentation to multiple clients over a network. The system includes a presentation server that produces and streams audio, video, and uniquely identified auxiliary data objects in separate sessions over a network; a buffer queue that stores uniquely identified auxiliary data objects to enable the presentation server to send ID indicia rather than an auxiliary data object when repeatedly referenced during the presentation; and a client that renders the data objects and stores the auxiliary data objects in a local memory cache, the client being responsive to the ID indicia of the auxiliary data object to obtain the corresponding object from its local memory cache to render a auxiliary data object repeatedly referenced during the presentation. Also, the presentation server may retain auxiliary data objects in a queue and the clients include a program module to request a current or active auxiliary data object upon joining the network after commencement of the presentation and, in response to the request, the presentation server or a dedicated server provides the current or active auxiliary data object to the client.

Other aspects of the invention will become apparent upon review of the following description taken in conjunction with the accompanying drawings. The invention, though, is pointed out with particularity by the appended claims.

DESCRIPTION OF ILLUSTRATIVE EMBODIMENTS

Figure 1:
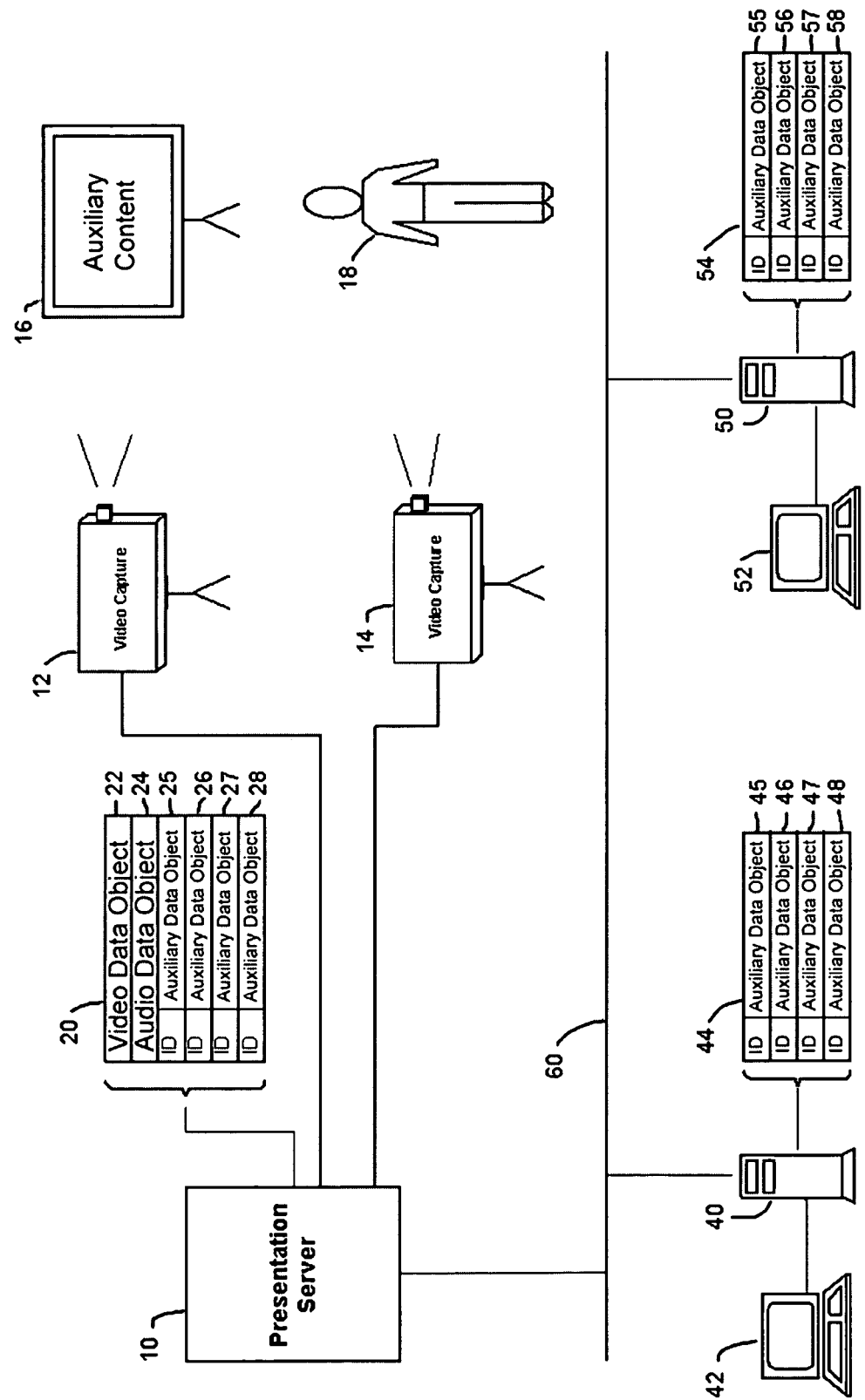
FIG. 1 conceptually illustrates a system to provide a streamed audio-video presentation including auxiliary data objects according to one aspect of the present invention.

In a multimedia streaming presentation, audio, video, and auxiliary information may be streamed using, for example, RTP (real time protocol) as the streaming protocol, RTSP (real-time streaming protocol) as the session control protocol, and SDP (session description protocol) as the session description protocol. As other protocols may also be utilized to stream a presentation, the present invention is not limited to protocols described herein. Each of the three components of the stream respectively containing audio, video, and auxiliary content is separately conveyed using individual sessions. For auxiliary data objects used in the presentation, an RTP or other payload format may be employed to carry an additional ID tag or mark so that, when repeated during the presentation, the associated unique ID tag may be transmitted rather than the entire payload contents of the data object. An exemplary RTP payload format for the auxiliary data object is specified under RFC 3640 [4]. Protocols for handling data objects are also described in the following references: H. Schulzrinne, A. Rao, R. Lamphier, "Real Time Streaming Protocol (RTSP)," RFC 2326, April 1998; M. Handley, V. Jacobson, "SDP: Session Description Protocol", RFC 2327, April 1998; H. Schulzrinne, S. Casner, R. Frederick, and V. Jacobson, "RTP: A transport protocol for real-time applications." RFC 1889, January 1996; and J. van der Meer, D. Mackie, V. Swaminathan, D. Singer, and P. Gentric, "RTP Payload Format for Transport of MPEG-4 Elementary Streams", RFC 3640, November 2003.

Advantages of providing individual sessions to transport auxiliary content of a streamed presentation include (i) enabling the source (e.g., camera) to focus on the speaker without interruption to capture other content, (ii) even though the video streaming bandwidth occurs at a relatively low frame-to-frame transmission rate, infrequently changing auxiliary content may be presented at a higher data density (i.e., high resolution); (iii) the bandwidth required to transport auxiliary content (e.g., a slide or 3D model) is low (especially when the auxiliary content changes infrequently) and therefore does not consume significant bandwidth in the streamed presentation, and (iv) remote users may navigate a local memory cache of previously transmitted auxiliary data objects without leaving a current audio/video presentation.

The invention is particularly advantageous in streaming situations involving a plurality of clients simultaneously receiving similar content over a network. As known, streamed objects may be broadcast and unicast. During a broadcast presentation, multiple clients receive streamed information over the same transmission channel, e.g., the Internet. During a unicast presentation, each client receives the same information but on different transmission channels. Given that a client may join or leave the broadcast/unicast presentation at random, the present invention considers how a client obtains access to auxiliary content already streamed when the client joins a broadcast/unicast broadcast already underway. The present invention also considers how a presentation server handles transmission of auxiliary data objects already present in the client's local memory cache when determining whether to make a repeated transmission of auxiliary content during the course of a presentation.

In an exemplary application of the invention illustrated in FIG. 1, presentation server 10 captures auxiliary content via camera 12 and captures audio/video information of presenter 18 via camera 14. Screen 16 may provide a medium from which camera 12 captures auxiliary content used in a presentation delivered by presenter 18. Auxiliary content, though, may be electronically generated or provided by a program application (e.g., Microsoft PowerPoint) without using a camera. Thus, presentation server 10 acquires digital representations of audio and video signals of camera 14 as well as visual (or other) information from auxiliary content 16 in order to produce a set of streamed data objects for transmission over network 60 according to the aforementioned or other streaming protocols. An outgoing buffer queue 20 temporarily stores the data objects, which are subsequently streamed over network 60. Queue 20 may reside in memory locations in server 10, or elsewhere, as known in the art. Network 60 may also carry broadcast or unicast traffic. Further, the network may comprise any type of wired or wireless data network such as the Internet, local or wide area network, a private network, POTS, or any other medium used to convey data.

Audio-visual data objects 22 and 24 of buffer queue 20 contain audio and video information captured by camera 14 whereas auxiliary data objects 25-28 contain current and previously transmitted auxiliary content used by the presenter. Once stored in memory, server 10 configures the data objects according to aforementioned or other streaming protocols. Server 10 also tags or marks the auxiliary content data objects with unique identification indicia (e.g., an ID number) so that, when transmitted over the network, a record or transmission log may be kept indicating their prior use and transmission during the streaming presentation. The data objects in buffer queue 20 may also include time-of-life or other indicia (not shown) in order to render them with associated audio/video data objects.

In an operative embodiment, server 10 may maintain two separate logs: (i) an ID-tagged list of auxiliary data objects transmitted to the clients during the streaming session and (ii) join time and storage capability of each client. When sending an auxiliary data object over the network, program instructions of server 10 effect checking of the transmission log to determine whether to transmit only the ID thereof (and/or other associated information) instead of the full payload of the object if it was sent earlier during the presentation. Each time server 10 decides whether to transmit the full content of an auxiliary data object, it may also cross-check the two lists to determine according to client join time and/or an object transmission log whether the object was previously transmitted to or received by the client. If the object was previously transmitted and received, server 10 transmits the ID tag that uniquely identifies the corresponding data object in the client's local memory cache. Server 10 may also consider and avoid overloading a client's memory cache capacity before sending a data object.

Multiple remote users situated at respective clients devices 40 and 50 (only two remote clients are shown) receive over network 60 streamed data objects containing of audio, video, and auxiliary information; which are rendered and played back on respective display and audio output devices 42 and 52. As explained, audio and video data objects are rendered in real time as they are received whereas the auxiliary data objects transmitted from buffer 20 of presentation server 10 are both rendered (according to their time-of-life indicia) and stored locally in a corresponding buffer cache 44 or 54 of the client 40 or 50. With respect to client 40, for example, buffer locations 45-48 of auxiliary data objects correspond to auxiliary data objects 25-28 of presentation server 10. Likewise, auxiliary data objects 55-58 of another client 50 correspond to auxiliary data objects 25-28. When client devices receive and locally store a previously transmitted auxiliary data object, it need only use the currently transmitted ID to subsequently locate and retrieve the contents of the identified data object within its own memory, i.e., buffer cache 44 or 54, and then display the auxiliary information along with any accompanying audio or video on output device 42 or 52. The auxiliary data objects may be called up for display in a "viewing window" of the viewing device 42 according to its ID tag or the user's desire. During a multimedia presentation, such "ID tagging" was found to save processing time and transmission bandwidth.

Client 40 may join a presentation at any time and thus may "miss" auxiliary content currently being presented. Because the current content was already sent, buffer 44 is likely devoid of the active auxiliary data object. To address this problem, server 10 senses the new client's connection to the network and responds by checking the server's client transmission log to determine whether the newly joined client has received current auxiliary content, and if not, immediately sends the contents of the full auxiliary data object along with the audio and video data objects. This typically occurs after a new sync cycle, e.g., after an I-frame is received. The full auxiliary content includes both the unique ID and payload data from which the current or active auxiliary content may be rendered or displayed, preferably in high definition. In a unicast presentation, checking the client transmission log and sending auxiliary data object/ID are performed on a client-by-client basis each time the server prepares to send an auxiliary data object. In such case, server 10 keeps a current auxiliary data object in memory even after expiration of its playback's start time and sends the current content to newly joined clients for storage in their local cache. Server 10 keeps the content until another auxiliary data object replaces current object in buffer queue 20. Thus, a client joining the network is able to readily fetch current auxiliary content from its own local cache immediately after connecting with network 60.

In a broadcast scenario where server 10 has no knowledge of joining client devices, two alternate solutions are proposed. According to a first solution, client 40 upon joining an ongoing broadcast presentation may send a separate IP or other network message to broadcast server 10 (or to a separate "new client registration" server designated for this purpose) to request and retrieve the current auxiliary data object whereupon the presentation or other server immediately responds to the request by sending the auxiliary data object to the client via a separate conventional IP message. The auxiliary data object may also be sent via any other type of session, data transmission, or network connection. The request and forwarding of the requested auxiliary data object may be conveyed over the same network 60, or a secondary network dedicated for that purpose. According to a second solution, the client 40 may preliminarily and temporarily join a separate broadcast session carried by network 60 where auxiliary data objects are repeatedly transmitted at regular intervals so that newly joined clients may fill its local cache with some or all of auxiliary data objects used during the presentation. Such recurring broadcasts may be multi-tasked by presentation server 10, or be handled by a secondary server dedicated to that task. In a preferred implementation, the client 40 may enter a second broadcast session over the same or other network only to obtain the first auxiliary data object that it had missed. After obtaining the current auxiliary data object, client 40 then joins (or reverts back to) the regular broadcast session to continue receiving the streaming broadcast over network 60.

Figure 2:
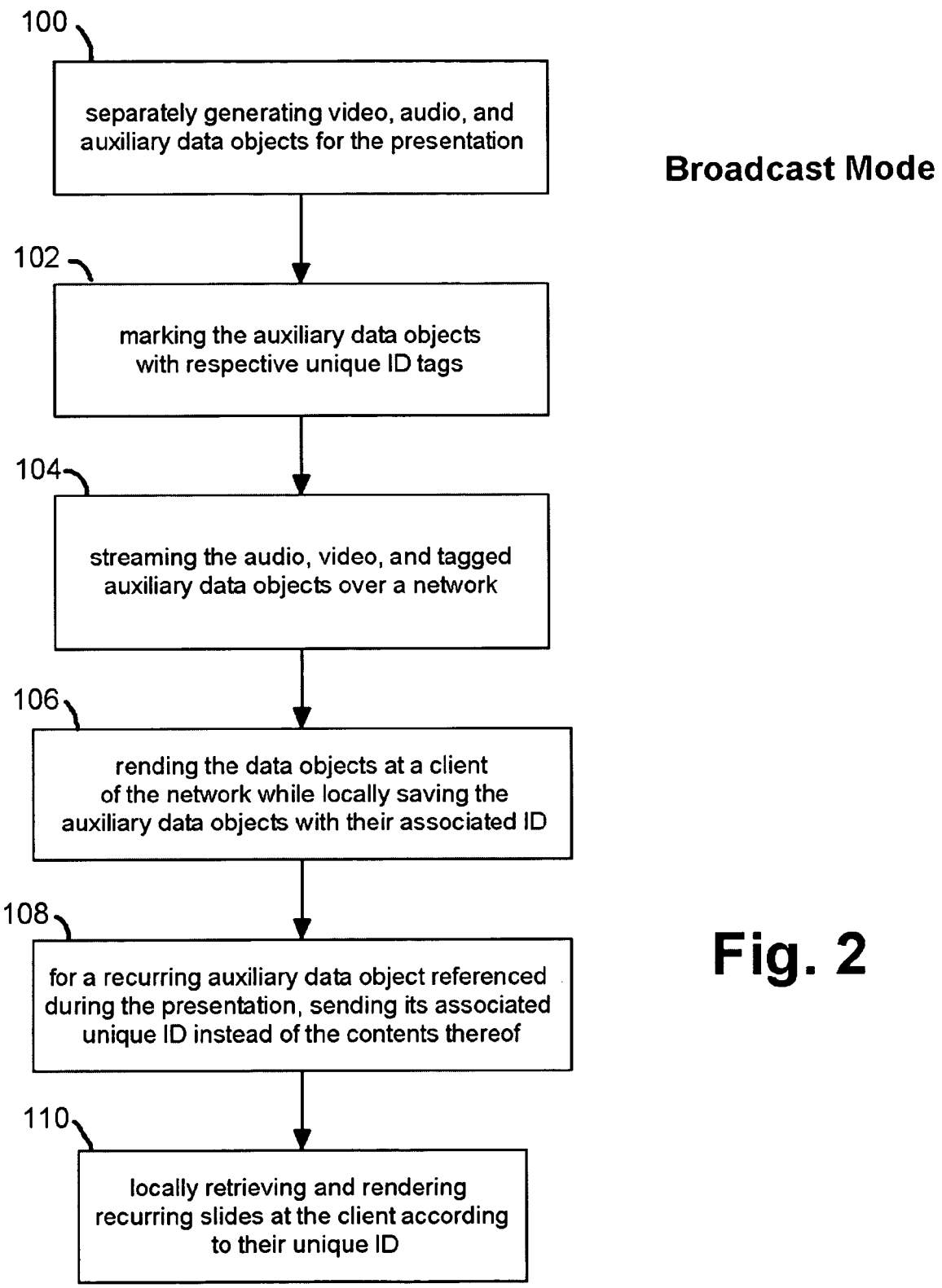
FIG. 2 illustrates a method of broadcasting a streamed audio-video presentation over a network according to another aspect of the present invention.

As shown in FIG. 2, another embodiment of the invention includes a method of broadcasting a presentation over a network. Such a method comprises a step 100 of separately generating video, audio, and auxiliary data objects for the presentation; step 102 of marking the auxiliary data objects with ID tags; step 104 of streaming the audio, video, and tagged auxiliary data objects over a network; step 106 of rendering the data objects at a remote end of the network as they are received by a client while locally saving the auxiliary data objects with their associated ID tags in a local memory cache (time-of-life and/or duration data may also be stored); step 108 of, for a recurring or repeated auxiliary data objects referenced during the presentation, streaming the associated ID tags instead of the full contents thereof; and a step 110 of locally retrieving and rendering auxiliary content at the client according to the streamed auxiliary data objects and/or ID tags. The network may be wired or wireless and may include the Internet, a local or wide area network, private network, a POTS line, or a combination thereof. Rendering includes displaying a static or dynamic (video) image as well as audio playback.

Figure 3:
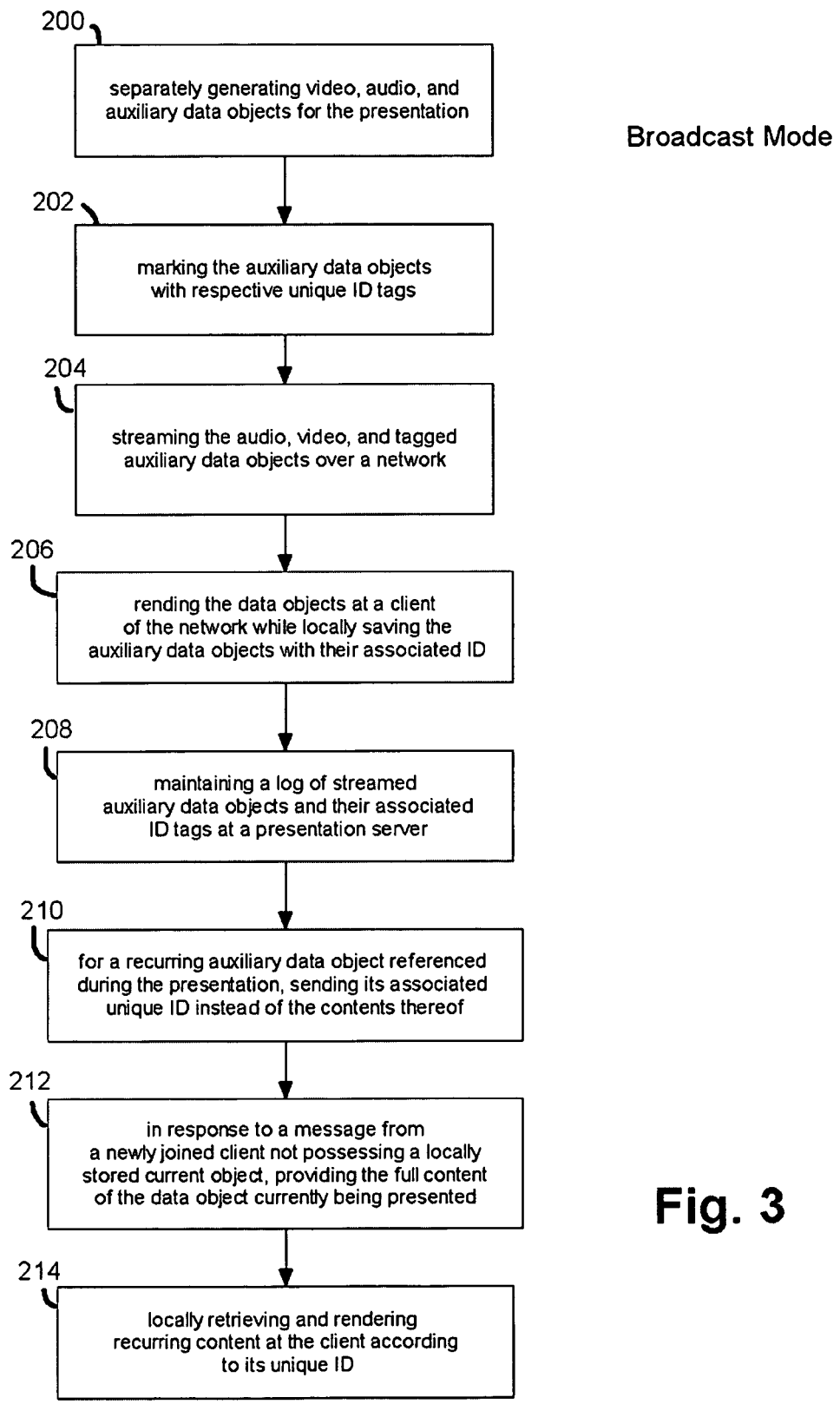
FIG. 3 illustrates another method of broadcasting a streamed audio-video presentation over a network according to another aspect of the present invention.

FIG. 3 shows an improvement of the aforementioned method that enables a newly joined client to obtain a current auxiliary data object being presented during a presentation when the local memory cache is devoid of a current or active auxiliary data object. In this case, steps 200-206 correspond with steps 100-106 of FIG. 2. The alternative method, however, further includes a step 208 of maintaining a log of streamed auxiliary data objects and their associated ID tags in a memory of a presentation server; a step 210 of, in response to a separate message from a newly joined client, providing the client with the full content of the current auxiliary data object; a step 212 of simultaneously rendering within their respective time windows the audio and video data objects along with any auxiliary data objects; and a step 214 of retrieving and rendering recurring auxiliary data object at a client according to the streamed ID tags. Providing the current auxiliary data objects may be performed by a primary presentation server or by secondary server dedicated for that purpose.

Figure 4:
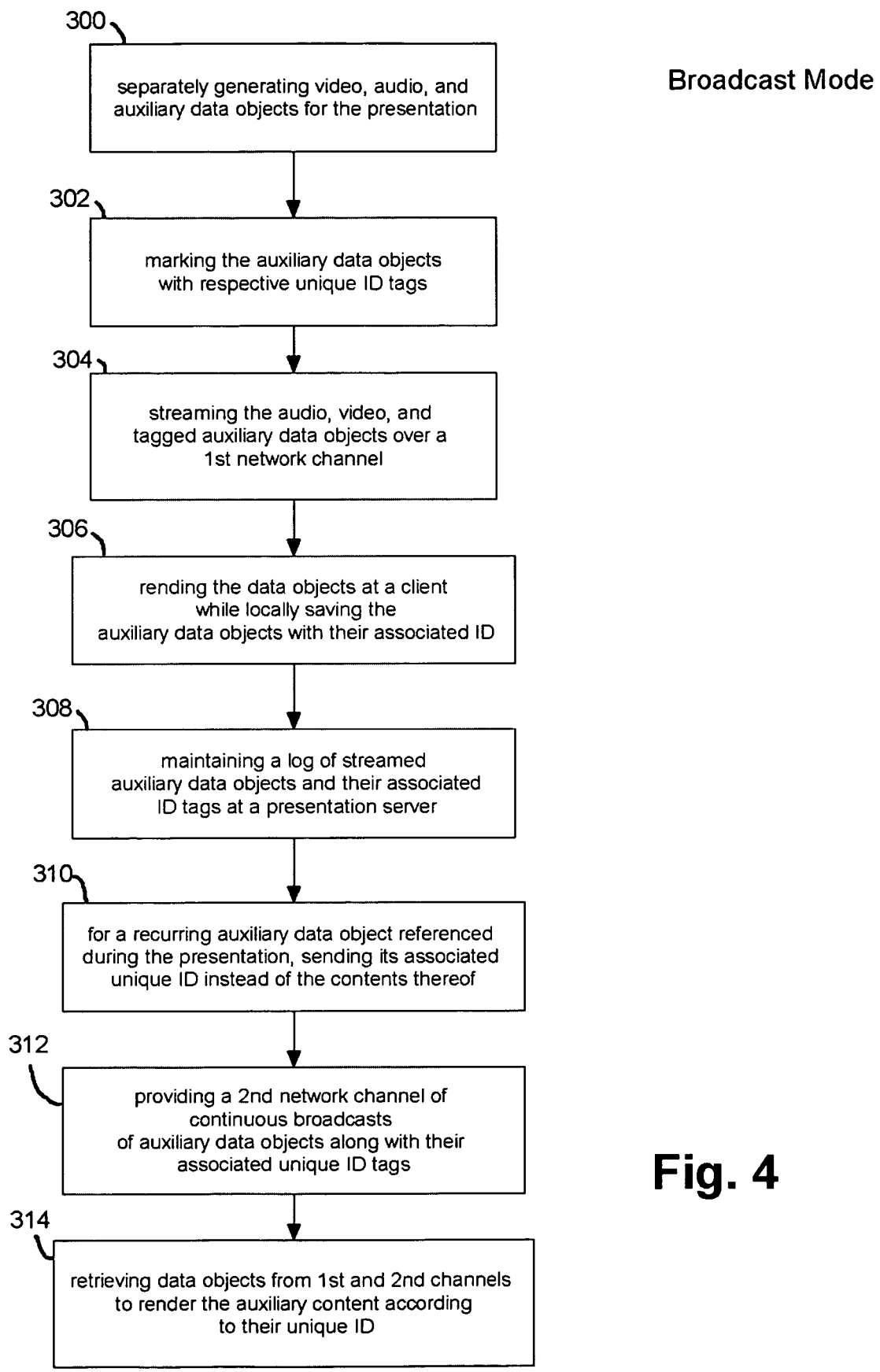
FIG. 4 illustrates another method of broadcasting a streamed audio-video presentation over a network according to another aspect of the present invention.

FIG. 4 shows another embodiment where steps 300-306 correspond with steps 100-106 of FIG. 2 except that, in step 304, streaming occurs during a first of two network sessions. Here, the embodiment further includes a step 308 of maintaining at the server a log of streamed auxiliary data objects and their associated unique ID tags; a step 310 of, for recurring auxiliary data objects referenced during the presentation, sending their associated unique IDs instead of the contents thereof; a step 312 of providing a continuous (e.g., round-robin) broadcast of auxiliary data objects along with their associated ID tags during a second network session; and a step 314 of retrieving data objects from the first and second network sessions to render them according to their content and/or unique IDs.

Figure 5:
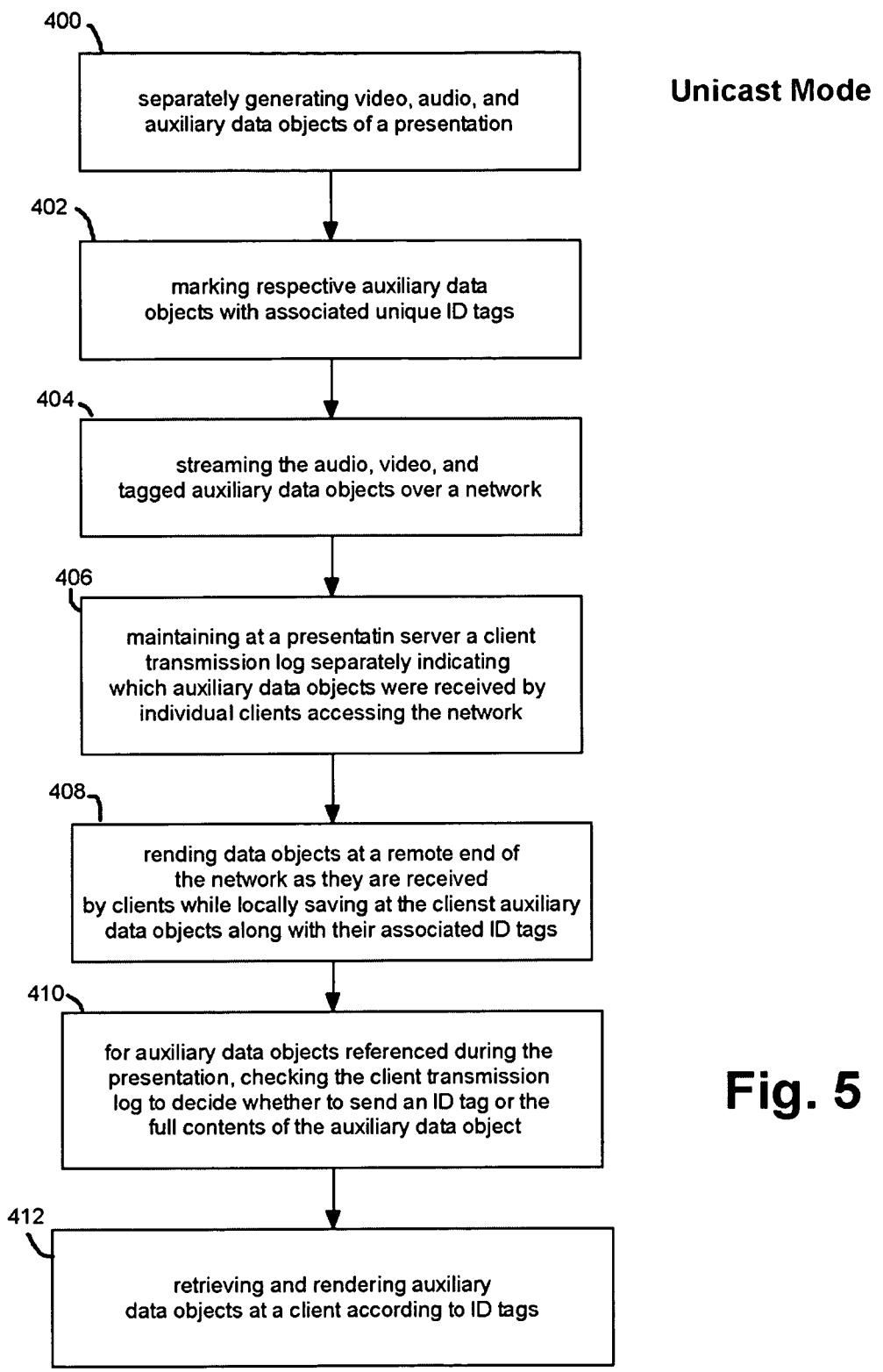
FIG. 5 illustrates a method of unicasting streamed video over a network according to yet another aspect of the present invention.

FIG. 5 shows yet another embodiment illustrating a method of unicasting a presentation to multiple clients/users over a network. Such a unicast method comprises a step 400 of separately generating video, audio, and auxiliary data objects of a presentation; a step 402 of marking respective auxiliary data objects with unique ID tags; a step 404 of streaming the audio, video, and tagged auxiliary data objects over a network; a step 406 of maintaining at a server a client transmission log separately indicating which auxiliary data objects were received by (and/or transmitted to) the individual clients on the network; a step 408 of rendering the data objects at a remote end of the network as they are received by a client while locally saving auxiliary data objects along with their unique ID tags; a step 410 of, for repeated auxiliary data objects referenced during the presentation, checking the client transmission log to decide whether to send to clients the unique ID tags instead of the full contents of associated auxiliary data objects (e.g., whether to send the full auxiliary data object to clients that have not previously received the same); and a step 412 of retrieving and rendering auxiliary data object at a client according to their ID tags. The unicast network may also be wired or wireless and may include the Internet, a local or wide area network, private network, a POTS line, or a combination thereof.

Using conventional techniques known in the art, computer program modules may be devised to carry out the aforementioned methods. Thus, another aspect of the invention comprises, a computer-readable medium embodying program instructions to effect separate generation of video, audio, and auxiliary data objects for the presentation; marking of auxiliary data objects with unique ID tags; streaming of audio, video, and tagged auxiliary data objects over a network; rendering of data objects at a remote end of the network as they are received by a client and to effect local storage at the client of auxiliary data objects with their associated unique ID tags; for a repeated auxiliary data objects referenced during the presentation, streaming of associated unique ID tags instead of the full contents thereof; and local retrieval and rendering of repeated auxiliary data objects according to the streamed auxiliary data objects or auxiliary data object retrieved from the local cache according to unique ID tags. The invention also embraces computer-readable medium that effects the methods described in connection with FIGS. 3-5.

Broadcast and unicast data objects, particularly slide or 3D model data objects, are rendered or displayed for a given duration within their respective time-of-life windows. In practice, audio and video data objects are rendered immediately after being streamed over the network and received by the client while the auxiliary data objects are displayed within a time window commensurate with presentation given by the presenter.

All data objects conveyed to a client are not necessarily streamed. Slides, for example, may be part of a static or dynamically updated webpage while audio and video may be streamed to a player module embedded within a web page. Even though this disclosure is primarily concerned with multimedia components of a presentation streamed to a user, it is to be understood that the invention embraces other applications. As streaming protocols other than RTP, RTSP, and/or SDP may be used to stream presentations, the invention is not limited thereto. It should also be understood that, in many cases, depending on the mode of delivery, using multi-modal delivery mechanism (for example, combining web page updates with streaming) may not be feasible or desirable. As an example, consider broadcasting to a set of wireless devices where a webpage update entails a unicast transmission to each wireless device, which undesirably increases the overall bandwidth requirement of the broadcast. Thus, the invention is not limited by the illustrated embodiments but additionally includes such modifications, alternatives, and adaptations as may come to those skilled in the art based on the teachings herein.

The invention claimed is:

1. A method of providing a streamed presentation to multiple clients
over a network comprising:
generating audio, video, and auxiliary data objects; marking the auxiliary data objects with unique ID tags;
streaming the audio, video, and tagged auxiliary data objects over said network to said clients while marking a first transmission time of said auxiliary data object;
at said clients, rendering the data objects and storing in a local memory cache of said clients said auxiliary data objects and associated unique ID tags;
for repeated auxiliary data objects referenced during the presentation, sending an associated unique ID tag of said data object to a client instead of contents of the associated auxiliary data objects when a join-time of the client precedes said first transmission time and automatically sending the contents of said auxiliary data object to the client when the join-time of said client follows said first transmission time; and
at said client, retrieving from said memory and rendering repeated auxiliary data object according to said unique ID tags.

2. The method of claim 1, wherein said streaming step comprise providing said audio, video, and auxiliary data objects in separate network sessions.

3. The method of claim 2, further comprising said client requesting a current auxiliary data object upon joining said network after commencement of said presentation and, in response to said request, providing said current auxiliary data object to said client.

4. The method of claim 3, further comprising streaming auxiliary data objects over said network and maintaining said streamed auxiliary data objects in a memory queue of said presentation studio.

5. The method of claim 4, further comprising associating and storing time-of-life indicia in said queue along with said auxiliary data object.

6. The method of claim 5, further comprising streaming said data objects in separate RTP sessions over the Internet.

7. The method of claim 3, further comprising providing said current auxiliary data object to said client via a separate network session.

8. The method of claim 1, further comprising continuously broadcasting available auxiliary data objects over said network to enable a joining client to obtain a missing auxiliary data object when joining after commencement of said presentation.

9. A method of broadcasting a streamed network presentation to multiple clients over a network comprising:
generating video, audio, and auxiliary data objects to respectively convey audio, video, and auxiliary content;
marking the auxiliary data objects with unique ID tags and a first transmission time;
streaming the audio, video, and tagged auxiliary data objects to said clients via separate sessions of a network;
after receipt by a client, rendering the data objects while storing in a local memory the auxiliary data objects with associated unique ID tags;
maintaining at a presentation server a log of streamed auxiliary data objects and associated unique ID tags;
for repeated auxiliary data objects referenced during the presentation, sending the associated unique ID tags instead of the contents thereof;
providing auxiliary data objects via a secondary broadcast along with associated unique ID tags; and
retrieving audio, video, and auxiliary data objects via said separate sessions and said secondary broadcast in order to render the audio, video and auxiliary data objects at a client wherein said auxiliary data objects are automatically retrieved from said secondary broadcast channel according to a comparison between said first transmission time and a join-time of said client.

10. A method of unicasting a streamed network presentation to multiple clients over a network comprising:
generating corresponding video, audio, and auxiliary data objects for the audio, video, and auxiliary content;
marking the auxiliary data objects with unique ID tags and a first transmission time;
streaming the audio, video, and tagged auxiliary data objects over the network;
after receipt by a client, rendering the data objects while storing in a memory the auxiliary data objects with associated unique ID tags;
maintaining at a server a client transmission log that separately indicates times of receipt of auxiliary data objects were received by respective clients accessing the network;

rendering the data objects received by a client while locally saving auxiliary data objects along with associated unique ID tags;

for auxiliary data objects repeated during the presentation, comparing entries in the client transmission log with said times of receipt of auxiliary object to decide whether to send an associated unique ID tag of an auxiliary data object instead of full contents of an auxiliary data object; and retrieving and rendering auxiliary data objects at a client according to unique ID tags.

11. A non-transitory computer-readable medium embodying program instructions executed by a digital computer to separately produce and stream audio, video, and uniquely identified auxiliary data objects in separate sessions; said medium enabling a digital computer to stream said audio, video, and tagged auxiliary data objects over the network to said clients; to mark a first transmission time of said auxiliary data objects; to render said data objects at a client and store in a local memory of said client said auxiliary data objects with associated unique ID tags; for auxiliary data objects repeatedly referenced during the presentation, to send associated unique ID tags instead of contents of associated auxiliary data objects according to a comparison between said first transmission time and a join-time of said client; and to retrieve from said memory to render repeated auxiliary data objects according to said ID tags.

12. The computer-readable medium as recited in claim 11, wherein program instructions of said medium further enable a client to request a current data object upon joining a broadcast session.

13. The computer-readable medium as recited in claim 12, wherein said program instructions enable said client to obtain a requested auxiliary data object via a secondary network session.

14. A system that provides a streamed presentation to multiple clients over a network comprising:

a presentation server that produces and streams audio, video, and uniquely identified auxiliary data objects in separate sessions over a network, said presentation server marking a time of first transmission of each of said auxiliary data objects;

a queue that stores uniquely identified auxiliary data objects to enable the presentation server to automatically send ID indicia rather than an auxiliary data object to a client device when repeatedly referenced during the presentation according to a comparison between said first transmission time and a join-time of said client device; and a client device that renders the data objects and stores said auxiliary data objects in a local memory cache, said client device being responsive to ID indicia of said auxiliary data object to obtain an associated object from said local memory cache to render an auxiliary data object repeatedly referenced during the presentation.

15. The system of claim 14, wherein said separate sessions respectively comprise RTP sessions.

16. The system of claim 15, wherein said server retains said auxiliary data objects in said queue and said client device includes a program module to request a current auxiliary data object upon joining said network after commencement of said presentation and, in response to said request, said presentation server provides said current auxiliary data object from said queue to said client device.

17. The system of claim 16, wherein said queue additionally contains time-of-life indicia associated with stored auxiliary data objects and said client device renders said auxiliary data objects according to said time-of-life indicia.

18. The system of claim 17, wherein said presentation server continuously broadcasts auxiliary data objects over said network to enable a joining client device to obtain a missing auxiliary data object via a secondary session after joining said presentation.

\* \* \* \* \*